United States Patent [19]

McGinnis, Jr. et al.

[11] Patent Number: 5,322,721

[45] Date of Patent: Jun. 21, 1994

[54] HIGH PRESSURE STEAM DEFLECTOR FOR PIPES

[75] Inventors: Errol E. McGinnis, Jr., Midlothian, Va.; Keith R. Watson, Wilmington, Del.; Timothy R. Wiseman, Richmond, Va.

[73] Assignee: E. I. Du Pont de Nemours and Company, Wilmington, Del.

[21] Appl. No.: 920,032

[22] Filed: Jul. 21, 1992

[51] Int. Cl.⁵ .................. B29D 22/00; F16L 9/14; F16L 55/00

[52] U.S. Cl. .................. 428/35.9; 138/103; 138/110; 138/140; 138/177; 428/36.1; 428/36.2; 428/36.9; 428/233; 428/236; 428/246; 428/252; 428/285; 428/286; 428/298; 428/302; 428/902; 428/911

[58] Field of Search .............. 428/229, 245, 246, 252, 428/911, 35.9, 36.1, 36.2, 36.9, 233, 236, 285, 286, 298, 302, 902; 138/103, 110, 140, 177

[56] References Cited

U.S. PATENT DOCUMENTS 5,104,357 6/1991 Wiseman, Sr. .............. 2/81

Primary Examiner—James D. Withers

[57] ABSTRACT

A protective high pressure steam deflector comprising a laminate of an outer layer of woven poly(p-phenylene terephthalamide) and an inner layer of aluminum is disclosed.

2 Claims, 2 Drawing Sheets

HIGH PRESSURE STEAM DEFLECTOR FOR PIPES

BACKGROUND OF THE INVENTION

1. Field of the Invention

The present invention relates to a fabric for deflecting high pressure steam and, thereby, providing protection from such steam in the case of leaks at pipe joints, including flanges, screwed and welded fittings, and the like, and at other mechanical connectors.

2. Description of the Prior Art

U.S. Pat No. 5,014,357, issued May 14, 1991 on the application of T. R. Wiseman, discloses a coverall for protecting a wearer against exposure to steam.

SUMMARY OF THE INVENTION

A high pressure steam deflector is provided. The deflector is to be positioned about steam pipes or other high pressure steam equipment and comprises a laminate of at least one layer of woven fabric of poly(p-phenylene terephthalamide) continuous filament yarns weighing at least 230 g/m$^2$ and a layer of aluminum which forms the inner surface of the deflector. The deflector of this invention can be in a flexible form and is wrapped about a steam pipe to encase steam pipe joints including high pressure steam equipment and mechanical connectors joined therewith.

DETAILED DESCRIPTION OF THE INVENTION

High pressure steam, that is steam supplied in pressures as high as 1000 psi, represents extreme hazard to persons and objects in the vicinity of piping or equipment containing such steam. The danger is especially serious at start-up of equipment utilizing such high pressure steam. There is a need for protective materials at high pressure steam joints and at high pressure steam equipment and gauges, to effectively deflect the steam at sites of leakage, especially during start-up when piping systems may not be completely proven.

Such protective materials must have an integrity which will withstand blasts of such high pressure steam in jets as might occur at piping joints or equipment.

For purposes of this invention, the phrase "steam pipes" shall include steam pipes and joints and fittings in such pipes and other equipment joined with such pipes.

Figure 1:
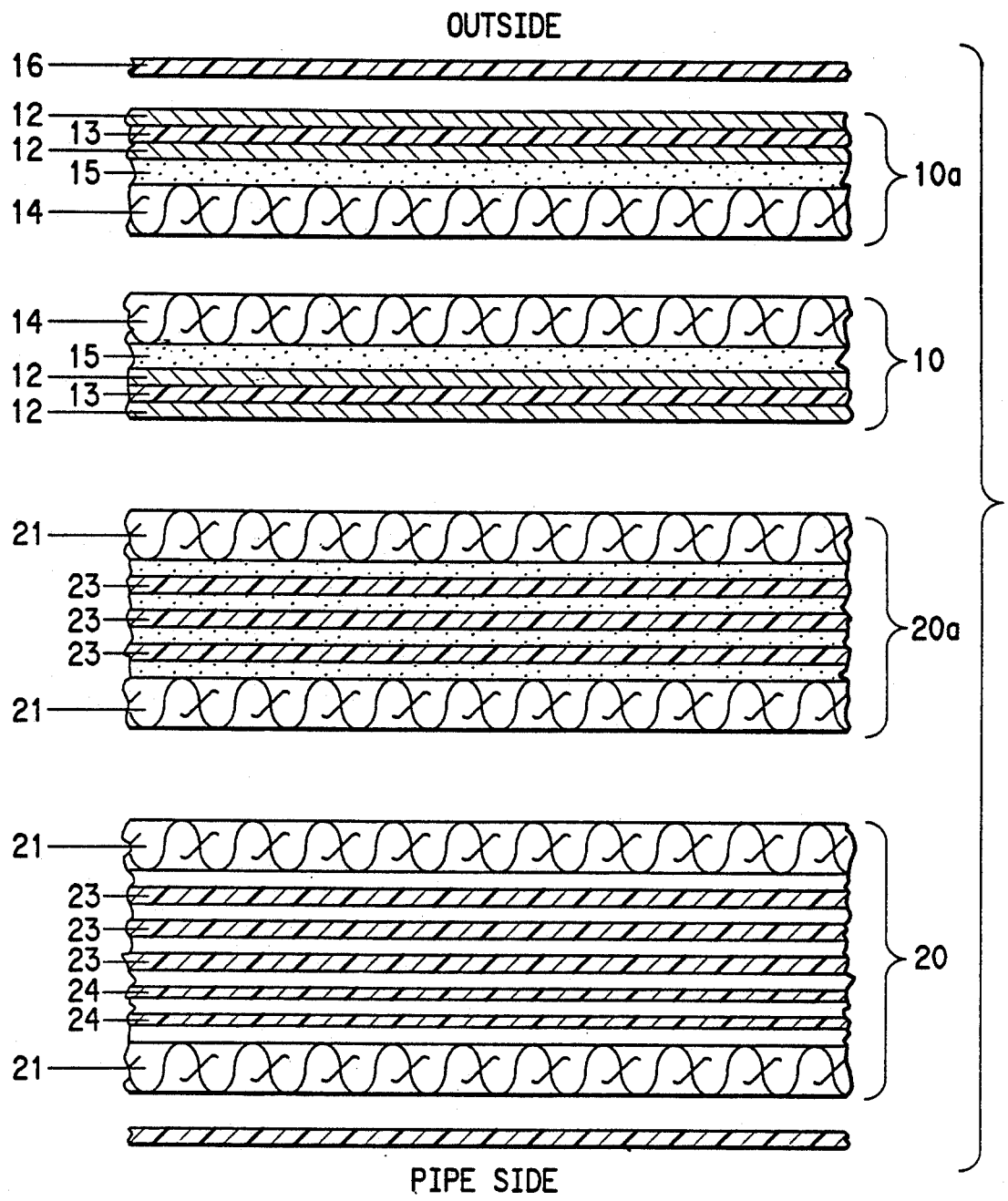
FIG. 1 is a schematic representation, in cross-section, of a preferred arrangement of layers of material in the steam deflector of this invention.

Referring now to the Figures, in FIG. 1, there is shown a preferred deflector material having an inner shell comprising protective layers 20, 20a, and waterproofing layer 25 and an outer casing comprising protective layers 10, 10a, and chemical protective layer 16. Inner shell 20, 20a and 25 forms the inner or pipe side of the deflector and outer casing 10, 10a, and 16 forms the outside of the deflector. The inner shell can function with protective layer 20, only, and the outer casing can function with protective layer 10, only; but it is preferred to include layers 20a and 25 in the inner shell and layers 10a and 16 in the outer casing.

Each high pressure steam deflector outer shell layer 10 includes a pair of aluminum layers 12 adhered to each other by a film 13 which is preferably polyethylene terephthalate or a polyethylene terephthalate/isophthalate copolymer. One of the two aluminum layers is laminated to a woven para-aramid fabric layer 14, preferably by means of a neoprene-based heat-resistant adhesive 15. When two outer casing layers 10 are used, they are positioned such that the para-aramid fabric layers 14 are together and facing each other and aluminum layers 12 are separated and form the outermost surfaces of the combined outer casing layers 10. When only one outer casing layer 10 is used, it is positioned such that aluminum layer 12 is facing the inner or pipe side. Aluminum layers 12 are preferably on the order of 20 micrometers thick. Chemical protective layer 16 is used to protect the overall deflector structure from water and other outside contaminants, in use. Chemical protective layer 16 can be made from polyethylene or polypropylene or any polymeric film usually used for such a purpose.

Para-aramid fabric layers 14 of outer casing layers 10 are formed from continuous filament yarns of poly(p-phenylene terephthalamide) (PPD-T) which are woven such that the resulting fabric weighs at least 230 g/m$^2$. The fabric is generally tightly woven in a plain or twill weave using heavy aramid yarns of at least 800 dtex and preferably at least 1000 dtex. The fabrics are generally woven to a tightness of at least 0.85 and preferably higher.

Insulating inner shell layers 20 and 20a of the deflector structure of this invention comprise woven meta-aramid fabrics 21 and multiple fibrous non-woven para-aramid layers 23. Inner shell layer 20 includes, in addition, a pair of thin film layers 24. All layers of materials 21, 23, and 24 are fastened together, by adhesives or by stitching, to form a unitary material. While it is preferred that at least 2 film layers 24 be used, a single layer may provide adequate protection. Fibrous non-woven para-aramid layers 23 should have a total weight of about 150 to 400 g/m$^2$ in each inner shell layer; and that total weight is generally provided by at least three individual layers 23 of material. Preferably, each fibrous non-woven para-aramid layer 23 is an individual non-apertured spun laced fabric of para-aramid staple fibers. Waterproofing layer 25 is utilized primarily as protection to the deflector structure from water that might be present at the pipe, in use. Waterproofing layer 25 can be made from polyethylene or polypropylene or any polymeric film usually used for such a purpose.

Woven meta-aramid fabrics 21 are generally made from yarns of poly(m-phenylene isophthalamide) (MPD-I) staple fibers. Non-woven para-aramid fibers 23 are generally made from poly(p-phenylene terephthalamide) (PPD-T) staple fibers.

Thin film layers 24 are present in inner shell layer 20 to retard steam movement through the composition; and they can be made from any polymeric film usually used for such a purpose. A preferred polymeric film is a flame-resistant vapor barrier elastomeric fiber made from, for example, terephthalate copolyetheresters.

The total weight of all of the layers of the inner shells 20 and 20a is typically about 300 to 850 g/m$^2$, preferably about 400 to 700 g/m$^2$. Additional aspects of the various layers of woven and non-woven fabrics, protective layers, adhesive layers, and the like, are described in U.S. Pat. No. 5,014,357 issued May 14, 1991 on the application of Wiseman; and that description is incorporated herein, by reference.

Figure 2:
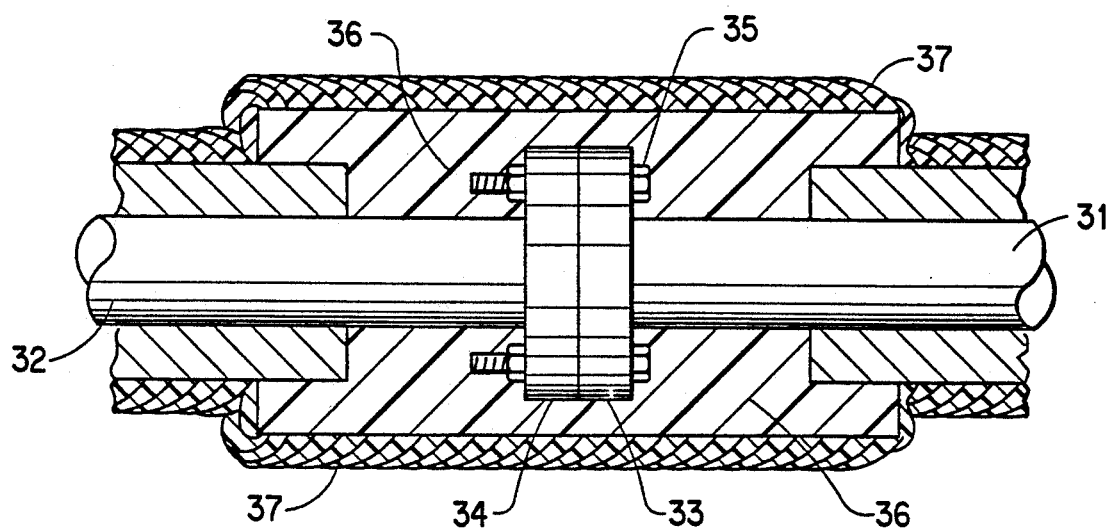
FIGS. 2 and 3 are representations, in partial cross-section, of various embodiments for using the deflector of this invention.

FIG. 2 is a cross-sectional representation of the use of the deflector of this invention to protect from the effect of leaks in a steam pipe. Pipes 31 and 32 have flanges 33 and 34 joined by bolts 35. In FIG. 2, the pipe joint which is formed at the juncture between flanges 33 and 34 is wrapped with insulation 36 and with several layers of steam deflector material 37 of this invention. Steam deflector material 37 is generally in the form of a flexible strip of protective layers of material, such as is made up from the combination of inner shell and outer casing layers depicted in FIG. 1, and is wrapped, in spiral overlapping fashion, around and along the steam pipe where protection is desired. One or several layers of wrapping can be used. The insulation 36, while not an element of the present invention, should be present in an amount or thickness to afford a maximum surface temperature, when the steam pipe is in operation, of 140° F.

Figure 3:
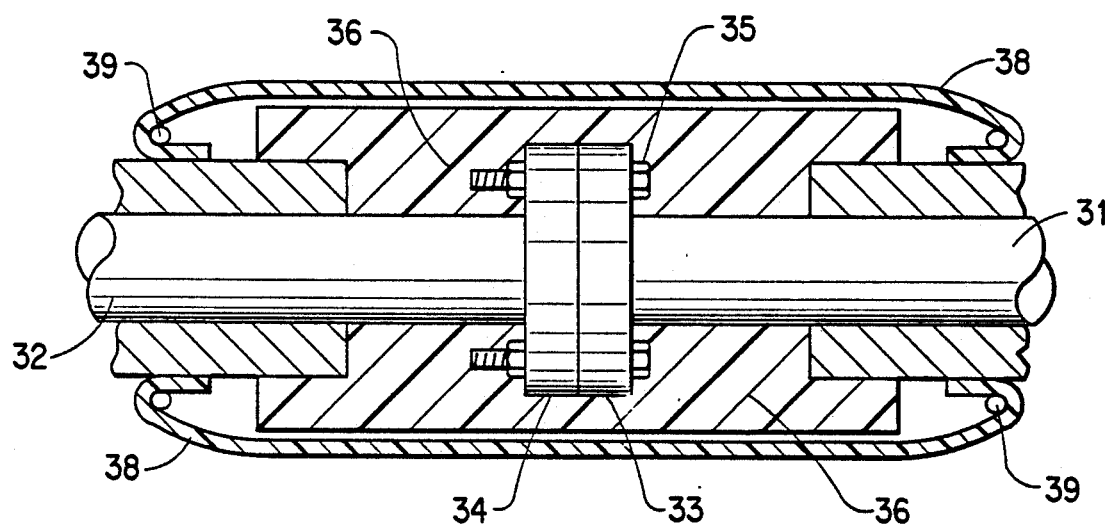

In FIG. 3, the same pipe joint comprising pipes 31 and 32 and flanges 33 and 34, is shown to be covered by a strip of the steam deflector material 38 of this invention wrapped about the pipe joint and maintained in place by some fastening means such as draw string 39. Draw string 39 should be made from high temperature resistant material such as metal wire or, preferably, a cord of PPD-T fibers. Of course, bands of material, such as metal strapping, can be utilized to hold deflector material 38 in place against the steam pipes in an equivalent manner.

Fabric tightness is determined and calculated as described in Research Disclosure, October, 1988, Publication Item No. 29498, "Calculation of Fabric Tightness Factor", pp 833-6. In determining fabric tightness, the decitex of a yarn is determined by removing the yarn from the fabric, hand extending the yarn to obtain a length of yarn without weave crimp, and then weighing that length to determine its approximate dtex. Then the yarn is loaded to 0.11 g/dtex and the length is remeasured. The remeasured length is used together with the weight of that length of yarn to calculate the dtex used in the formula for fabric tightness.

We claim:

1. A high pressure steam deflector positioned about a steam pipe comprising an inner shell and an outer casing with the inner shell located nearer than the outer casing to the steam pipe:
   a) the outer casing with an inner surface and an outer surface comprising a laminate of at least one protective layer of woven fabric of poly(p-phenylene terephthalamide) continuous filament yarns weighing at least 230 g/m$^2$ as the outer surface and at least one layer of aluminum as the inner surface;
   b) the inner shell positioned between the steam pipe and the outer casing comprising exterior layers on each outside surface of the inner shell of woven meta-aramid fabrics, at least one interior layer of non-woven para-aramid fabric, and at least one interior layer of a polymeric film.

2. The steam deflector of claim 1 wherein the deflector is flexible and is wrapped about a steam pipe.

* * * * *